(12) United States Patent
Dreyfus et al.

(10) Patent No.: US 8,271,590 B2
(45) Date of Patent: Sep. 18, 2012

(54) PROCESSING ELECTRONIC MESSAGES ACCORDING TO SENDER CLASSIFICATION

(75) Inventors: Marc Dreyfus, Brooklyn, NY (US); Derek S. Lam, Minneapolis, MN (US); Michael Muller, Medford, MA (US); Asima Silva, Holden, MA (US); Ping Wang, Westford, MA (US); Robert C. Weir, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 11/874,945

(22) Filed: Oct. 19, 2007

(65) Prior Publication Data

US 2009/0106370 A1 Apr. 23, 2009

(51) Int. Cl.
*G06F 15/16* (2006.01)
(52) U.S. Cl. .......................... 709/206; 709/205; 709/207
(58) Field of Classification Search .................. 709/206, 709/205, 207
See application file for complete search history.

(56) References Cited

U.S. PATENT DOCUMENTS

| | | | |
|---|---|---|---|
| 6,088,696 A | 7/2000 | Moon et al. | |
| 6,396,513 B1 | 5/2002 | Helfman et al. | |
| 6,560,638 B1 * | 5/2003 | Haneda et al. | 709/206 |
| 6,725,228 B1 | 4/2004 | Clark et al. | |
| 6,912,519 B2 | 6/2005 | Shouji | |
| 6,941,304 B2 | 9/2005 | Gainey et al. | |
| 6,957,259 B1 | 10/2005 | Malik | |
| 7,136,897 B1 | 11/2006 | Raghunandan | |
| 2002/0116641 A1 | 8/2002 | Mastrianni | |
| 2004/0111478 A1 * | 6/2004 | Gross et al. | 709/206 |
| 2004/0167963 A1 * | 8/2004 | Kulkarni | 709/206 |
| 2004/0199593 A1 * | 10/2004 | Simpson | 709/206 |
| 2005/0015451 A1 | 1/2005 | Sheldon et al. | |
| 2005/0188030 A1 | 8/2005 | Hudecek | |
| 2006/0010213 A1 | 1/2006 | Mehta | |
| 2006/0031328 A1 * | 2/2006 | Malik | 709/206 |
| 2006/0031356 A1 | 2/2006 | Drouet et al. | |
| 2006/0041628 A1 | 2/2006 | Muller | |
| 2008/0147818 A1 * | 6/2008 | Sabo | 709/206 |
| 2008/0270557 A1 * | 10/2008 | Bhamidipaty et al. | 709/206 |

OTHER PUBLICATIONS

Gutierrez, "Alan's Blogometer", <http://blogometer.com/post/thunderbird-tagging-extension/> (Feb. 21, 2006) (Last visited Sep. 19, 2007).
Taglocity, "Tagging for Microsoft Outlook", <http://www.taglocity.com/> (Last visited Sep. 19, 2007).
Muller et al., "Working Together Inside an Emailbox", Proceedings of ECSCW 2005, Paris, France (Sep. 2005).
Wang, "Social Network Analysis for E-mail Filtering", Proceedings of the 6th Cyberspace Conference, pp. 69-78, Taoyuan, Taiwan (Oct. 15, 2004).

* cited by examiner

*Primary Examiner* — Haresh N Patel
*Assistant Examiner* — Harunur Rashid
(74) *Attorney, Agent, or Firm* — Cuenot, Forsythe & Kim, LLC

(57) ABSTRACT

A computer-implemented method of sorting electronic messages can include identifying at least one recipient of an electronic message and retrieving a classification scheme of the recipient. An identifier can be included within the electronic message. The identifier can specify a tag selected from the classification scheme of the recipient. The electronic message, including the identifier specifying the selected tag, can be sent.

12 Claims, 3 Drawing Sheets

PROCESSING ELECTRONIC MESSAGES ACCORDING TO SENDER CLASSIFICATION

FIELD OF THE INVENTION

The embodiments of the present invention relate to electronic messaging systems and, more particularly, to processing and sorting electronic messages.

BACKGROUND OF THE INVENTION

Electronic messaging systems have become an important means of communication within organizations and among individuals. Examples of electronic messaging systems include electronic mail systems, instant messaging systems, short-message-service (SMS) systems, text messaging systems, or the like. Though electronic messaging systems offer significant advantages over their paper-based counterparts, organizing the large number of electronic messages one receives throughout the day, week, month, or year remains a challenge.

Organizational experts have identified five general stages of personal document organization. These stages include collection, sorting, prioritization, action, and archive/deletion. Though one or more or all of the stages may be implemented differently from one user to another, each user typically engages in some incarnation of these five stages of document organization. The second stage called "sorting," for example, can consume as much of 20% of a user's productive time during the day, thereby reducing overall user productivity.

Many users utilize messaging systems, e.g., electronic mail clients and/or systems, as time management tools. The electronic messaging system effectively becomes the primary repository for storing actionable work documents. These documents, at some point, must be sorted to support document retrieval so that users are able to locate documents and act upon the documents as intended.

BRIEF SUMMARY OF THE INVENTION

The embodiments disclosed herein relate to classification and/or sorting of electronic messages. One embodiment of the present invention can include a computer-implemented method of sorting electronic messages. The method can include identifying at least one recipient of an electronic message, retrieving a classification scheme associated with the recipient, and including an identifier within the electronic message. The identifier can specify a tag selected from the classification scheme of the recipient. The electronic message, including the identifier specifying the selected tag, can be sent.

Another embodiment of the present invention can include a computer-implemented method of sorting electronic messages including identifying a sender of an electronic message, including an identifier within the electronic message, wherein the identifier specifies a tag selected from a classification scheme associated with the sender, and sending the electronic message including the identifier specifying the selected tag. A prompt can be generated whether to accept the tag associated with the electronic message. The electronic message can be classified according to a user input received responsive to the prompt.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
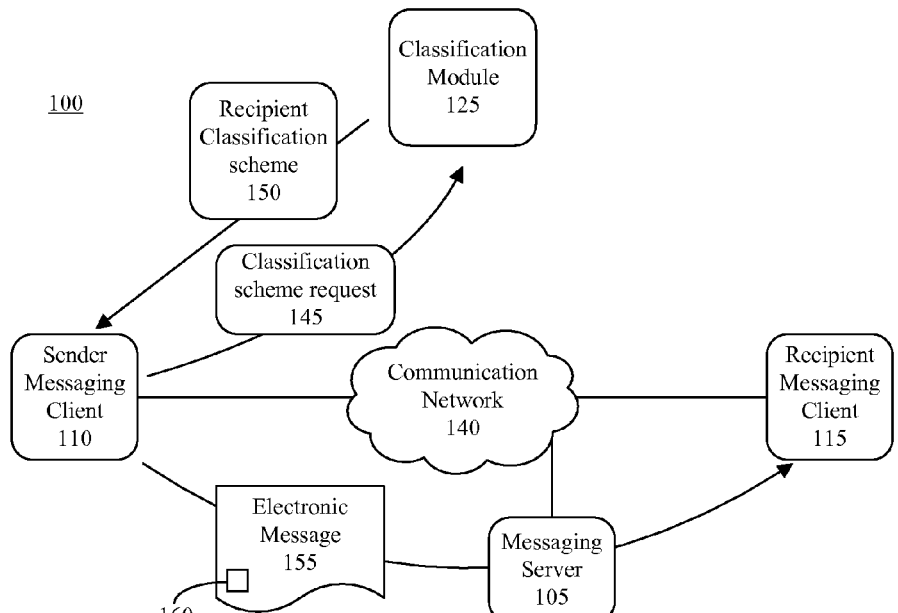
FIG. 1 is a block diagram illustrating an electronic messaging system that facilitates classification and/or sorting of electronic messages in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device). A non-exhaustive list of exemplary computer-readable media can include magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to classification and/or sorting of electronic messages. Electronic messages can be classified by the sender of the electronic message. Sender classification of electronic messages may save sorting time with respect to the recipient of the electronic message as the sender is already familiar with the content of any communication he or she is sending. In some cases, the particular classification used by the sender can be selected from a classification scheme that has been defined by the recipient of the electronic message. In other cases, the classification used by the sender can be one selected from a sender classification scheme or a centralized classification scheme that can be used by both sender and recipient.

The classification can be encoded within the electronic message being sent. Upon receipt of the electronic message, e.g., within a recipient messaging client, the electronic message can be classified according to the encoded classification. The recipient also may choose to accept or reject, e.g., override, the classification that was selected by the sender and encoded into the electronic message. Other aspects of the present invention will be described in greater detail herein with reference to the accompanying figures.

FIG. 1 is a block diagram illustrating an electronic messaging system (messaging system) 100 that facilitates classification of electronic messages in accordance with one embodiment of the present invention. The messaging system 100 can include a messaging server 105, a plurality of messaging clients, e.g., sender messaging client 110 and recipient messaging client 115. The messaging system 100 further can include classification module 125. The various components of system 100 can be communicatively linked through a communication network 140.

The communication network 140 can be implemented as, or include, without limitation, a WAN, a LAN, the Public Switched Telephone Network (PSTN), the Web, the Internet, and/or one or more intranets. The communication network 140 further can be implemented as or include one or more wireless networks, whether short or long range. For example, in terms of short range wireless networks, the communication network 140 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 140 can include a mobile, cellular, and or satellite-based wireless network and support voice, video, text, and/or any combination thereof. Examples of long range wireless networks can include GSM, TDMA, CDMA, WCDMA networks or the like.

The messaging system 100 can be implemented as, for example, an electronic mail system, an instant messaging (IM) system, a Short Messaging System (SMS), or the like. In this regard, the messaging server 105 can be implemented as an electronic mail server, an instant messaging server, an SMS server, or other communication hub or server capable of routing electronic messages within or as part of the communication network 140. Other examples of electronic messaging systems, with which the embodiments disclosed herein may be used, can include, but are not limited to, blogs and systems supporting electronic document workflow and/or routing. In any case, the messaging server 105 can include suitable operational software for performing the various functions described herein.

The messaging clients 110-115 can be implemented as any of a variety of communication devices executing suitable communication software. For example, each messaging client can be implemented as a computer system or other information processing system. One or more of the messaging clients 110-115 may also be implemented as a portable or mobile computing device, e.g., a mobile telephone, a wireless-enabled personal digital assistant, a portable computer, e.g., laptop, or the like. Each of the messaging clients 110-115 can include and/or execute suitable communication software, e.g., an IM client, an electronic mail client, or an SMS client, which enables the messaging client to communicate with the messaging server 105, the classification module 125, and/or other messaging clients through the communication network 140 to perform the functions disclosed herein.

The classification module 125 can include one or more classification schemes for various users of the messaging system 100. In one embodiment, the classification module 125 can be implemented as a standalone module including logic and data, e.g., as a Lightweight Directory Access Protocol (LDAP)-based module, capable of receiving and responding to queries relating to classification scheme data. It should be appreciated that while illustrated as a system or module that is separate from the messaging server 105, the classification module 125, referring to data, or functionality, or both, may be implemented within or as part of the messaging server 105. The embodiments of the present invention are not intended to be limited by the particular implementation of the classification module 125.

In one embodiment, the classification module 125 can include one or more classification schemes for each user registered with the messaging system 100. A "classification scheme," as used herein, can refer to a plurality of tags, keywords, or subject headings (collectively "tags"). Each classification scheme can specify a listing or a hierarchy of tags. The tags can be associated with various electronic messages and/or electronic documents. For example, through a messaging client, a user can associate a tag with an electronic message. In this sense, the electronic message is classified according to the tag as the tag may be used for purposes of searching, filtering, and/or information retrieval.

The classification schemes can be implemented as folksonomies, taxonomies, or a combination thereof as will be described in further detail. A "folksonomy" generally refers to the collection of tags that can be created by a user within a "social tagging system" or a "collaborative tagging system." "Collaborative tagging" generally refers to a system or process through which users associate keywords, known as "tags," with various objects or references to objects, e.g., data. Each tag can be user-defined and is usually descriptive of some aspect of the object(s) to which the tag is associated. A tag can be viewed as a form of metadata in that each tag can provide information about the data to which the tag is associated. By comparison, a "taxonomy" generally refers to a more rigid structure that utilizes a predefined, and possibly static, classification system. A taxonomy generally is hierarchical in nature. A folksonomy is generally flat.

In one embodiment, each classification scheme stored within the classification module 125 can be a user defined classification scheme. This allows each user to define a set of tags specific to that user, which may or may not differ from the classification scheme defined by other users. In another embodiment, classification schemes stored within the classification module 125 may be more rigid in nature, e.g., similar to a taxonomy. For example, a neutral classification scheme can be implemented as a centrally managed classification scheme. Each individual user can utilize the neutral classification scheme.

In terms of combining taxonomy and folksonomy characteristics, user classification schemes stored within the classification module 125 may be hybrids of a neutral or centrally managed classification scheme. In that case, for example, each user may alter the neutral classification scheme to suit that user's own individual needs. The resulting classification scheme, however, can be related back to the original neutral classification scheme, e.g., through canonical mapping. This allows the classification scheme of one user to be mapped onto the classification scheme of another user. Hence, a one-to-one correspondence between tags of the sender classification scheme and the tags of the recipient classification scheme may exist, whether the individual tags of each user, e.g., sender and recipient, are identical or not.

In operation, a sender can begin creating an electronic message 155 to be sent or delivered to a particular recipient. As used herein, a "recipient" of an electronic message can be a user or communication address of a user specified in a "to" field of the electronic message. A recipient further can be a user or communication address specified in another field such as a "carbon copy" or "cc" field, a "blind copy" or "bc" field, or the like. Any user or communication address of a user that receives an electronic message can be considered a recipient of that electronic message. The "sender" may be considered the user or communication address from which the electronic message was sent or originated. Within this specification, the term "user" and "communication address" may be used interchangeably as each refers to a particular online entity, user identity, or profile. Likewise, the terms "sender" or "recipient" also may be used to refer to a "user" or a "communication address" of a user as the case may be.

As the sender authors the electronic message 155 and specifies the recipient for the electronic message 155, the sender messaging client 110 can send a classification scheme request 145 to the classification module 125. The classification scheme request 145 can query the classification module 125 for the classification scheme used by, or that is associated with, the recipient of the electronic message 155. The classification module 125 can identify the recipient classification scheme 150 and send the recipient classification scheme 150 back to the sender messaging client 110.

The sender of the electronic message 155 can view the recipient classification scheme 150 via the sender messaging client 110. An input can be received within the sender messaging client 110 that selects a particular tag or tags in the recipient classification scheme 150. The sender messaging client 110 can encode or include an identifier 160 of the selected tag(s), which may be the tag itself, within the electronic message 155. The electronic message 155 can be sent to the recipient messaging client 115 via the communication network 140, the messaging server 105, and/or other network nodes.

Upon receipt of the electronic message 155 within the recipient messaging client 115, the identifier 160 can be identified and processed. The recipient messaging client 115 can perform a decoding and/or look-up operation of the identifier 160 with reference to the recipient classification scheme 150 to determine the tag or tags specified by the sender according to the identifier 160. The recipient messaging client 115, for example, may request the recipient classification scheme 150 from the classification module 125 or have a copy stored locally that may be referenced. The recipient messaging client 115 can classify the electronic message 155 according to the encoded identifier 160, e.g., classify the electronic message 155 according to the tag(s) specified by the identifier 160, within the recipient messaging client 115.

The embodiments presented with reference to FIG. 1 are presented for purposes of illustration and, as such, are not intended to be limiting. Other embodiments are contemplated which will be described herein with reference to the remaining figures. For example, in another embodiment, the classification scheme used by the sender can be a sender classification scheme. The classification scheme of the sender and the recipient may correspond to one another. For example, there can be a one-to-one correspondence between tags of the sender and recipient classification schemes. The recipient may have the opportunity to accept or reject the classification, e.g., tag(s), selected by the sender for the electronic message.

In one embodiment, the classification module 125 can include protections from unauthorized accesses, e.g., through an Access Control List (ACL). The ACL can protect the classification schemes stored within the classification module 125 at the top level, e.g., restrict access to entire classification scheme(s) for a user, or restrict access to particular tags of the classification scheme of a user. The use of ACLs also can facilitate selective access to the classification scheme of particular users. For example, a sender may be required to provide a password to access the classification scheme of a given recipient.

In another embodiment, one or more users within the messaging system 100 can be associated with more than one classification scheme. In that case, the particular classification scheme that is provided, for example, to a sender, can be selected according to a classification scheme selection policy that can specify various parameters. Such parameters can, for example, define a relationship between the sender and the recipient, a corporate policy, the organizational role of the sender, the organizational role of the recipient, and/or the organizational relationship between the sender and the recipient. For example, one classification scheme for a recipient can be made available to internal corporate users, while another classification scheme for a recipient can be made available to outside users responsive to a classification scheme request 145.

In another example, the classification module 125 can utilize the ACLs to password protect particular classification schemes of a user or particular tags of a classification scheme of a user without a password. For instance, the sender may be asked for a password to access the classification scheme of the recipient, particular tags of a classification scheme of the recipient, etc. Based upon the password provided, if any, the classification module 125, for example, can select a particular classification scheme from a plurality of classification schemes for the recipient, select particular tags from a classification scheme or from a particular one of a plurality of classification schemes for the recipient, etc.

In still another embodiment, more specialized classification schemes can be reserved and made available only to privileged communication partners. For example, within a customer service business or organizational unit, particular customers that are rated "premium" customers may be given access to a more detailed classification scheme when communicating with the organization or a representative (recipient) of an organization. Accordingly, communications from such users would be more easily identified as the electronic messages would include tags reserved for customers having the "premium" status.

Figure 2:
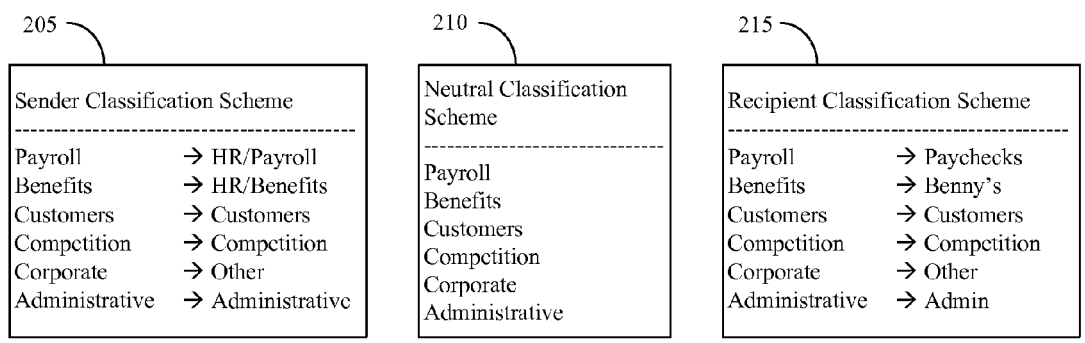
FIG. 2 is a block diagram illustrating exemplary classification schemes in accordance with another embodiment of the present invention.

FIG. 2 is a block diagram illustrating exemplary classification schemes in accordance with another embodiment of the present invention. FIG. 2 illustrates the case where the classification scheme of one user can be mapped onto the classification scheme of another user despite customizations being applied to one or more of the classification schemes. FIG. 2 depicts a sender classification scheme 205, a neutral classification scheme 210, and a recipient classification scheme 215.

The neutral classification scheme 210 can be a centrally managed classification scheme, e.g., a corporate classification scheme, available for use by users of an organization. As shown, the sender classification scheme 205 can specify changes to the neutral classification scheme 210 that the sender has implemented. Each change can be tracked so that a one-to-one correspondence can exist and be maintained between each resulting tag of the personalized, sender classification scheme 205 and each tag of the neutral classification scheme 210. For example, the tag "corporate" has been changed by the sender to "other," but still can be mapped to "corporate."

Similarly, the recipient classification scheme 215 can indicate particular customizations to the neutral classification scheme 210. Each resulting tag of the recipient classification scheme 215 can maintain a one-to-one correspondence with a tag of the neutral classification scheme 210. This correspondence between user classification schemes 205 and 215 and the neutral classification scheme 210 allows mapping of the tags between users. For example, when the sender assigns a tag such as "Administrative," which is selected from the sender classification scheme 205, to an electronic message, the recipient messaging client later can interpret the associated tag as "Admin" in accordance with the recipient classification scheme 215. Thus, a one-to-one correspondence of tags can be maintained despite the tags not being identical from one classification scheme to another.

Figure 3:
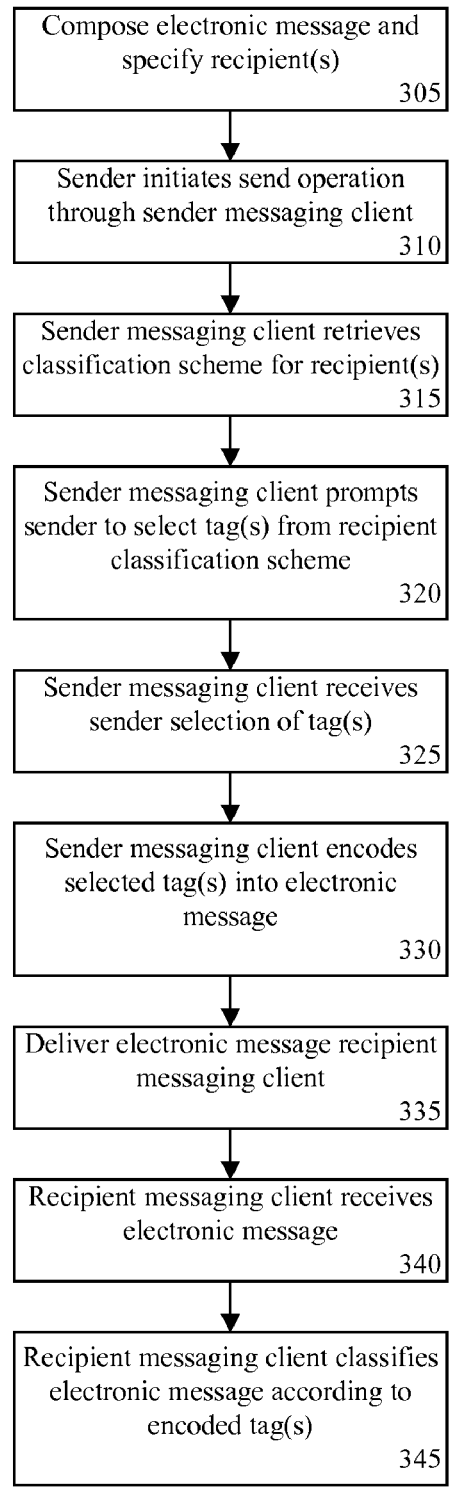
FIG. 3 is a flow chart illustrating a method of sorting an electronic message in accordance with another embodiment of the present invention.

FIG. 3 is a flow chart illustrating a method 300 of sorting an electronic message in accordance with another embodiment of the present invention. The method 300 can be implemented by a system as described with reference to FIG. 1 or other similar system. Accordingly, the method 300 can begin in step 305 where a sender composes an electronic message within, or using, a sender messaging client. The sender can specify one or more recipients of the electronic message.

In step 310, the sender can initiate a send operation, e.g., from within the sender messaging client, to deliver the electronic message to the recipient(s) of the electronic message. In step 315, the sender messaging client can retrieve the classification scheme associated with the recipient(s). For example, responsive to the initiation of the send operation, the sender messaging client can issue a classification scheme request to the classification module. The classification scheme request can specify one or more recipients of the electronic message. The classification module can locate the classification scheme associated with the recipient(s) specified in the request and send the classification scheme(s) back to the sender messaging client.

When the electronic message specifies more than one recipient, any of a variety of different actions can be taken. For example, the first recipient of the plurality of recipients specified for the electronic message can be specified in the classification scheme request. The classification scheme for the first specified recipient can be returned. In another example, each recipient, or at least a plurality of recipients, of the electronic message can be specified within the request. In that case, the classification scheme for each recipient specified in the request can be retrieved. The classification schemes can be combined, for example, by taking a union or by taking an intersection of the retrieved classification schemes. It should be appreciated that either the sender messaging client or the classification module can be tasked with combining or otherwise processing the classification schemes described herein, e.g., taking a union or intersection. In any case, the newly generated classification scheme can be used by the sender messaging client as described herein.

In one embodiment, when the recipient is associated with more than one classification scheme, one classification scheme can be selected from the plurality of classification schemes associated with the recipient. The selection can be performed by the messaging server and further can be predicated upon any of a variety of parameters such as identity of the sender, identity of the recipient, organizational distance between the sender and recipient, a password from the sender, or the like.

It should be appreciated that in some cases, step 315, relating to classification of the electronic message, may be performed prior to step 310, which relates to initiating the send operation. For example, the sender can activate a "classify" button or control to initiate step 315 at any time prior to sending the electronic message. After classifying the electronic message, the sender can initiate step 310.

Continuing with step 320, the sender messaging client can prompt the sender to select one or more tags from the received classification scheme of the recipient. It should be appreciated that the composite classification scheme noted herein, e.g., formed from a plurality of classification schemes, also can be referred to as a recipient classification scheme as the composite classification scheme is generated from a plurality of recipient classification schemes. The sender messaging client can present, e.g., visually, audibly, etc., the recipient classification scheme. For instance, the tags of the classification scheme can be displayed with graphical user interface selection mechanisms, e.g., radio buttons, check boxes, etc. In step 325, the sender messaging client can receive a user input specifying one or more tags from the recipient classification scheme.

In step 330, the sender messaging client can encode the selected tag(s) within the electronic message. An identifier corresponding to the selected tag, or tags, can be inserted into the electronic message. For example, the identifier can be inserted into the header portion of the electronic message. It should be appreciated that the identifier of the tag that is encoded can by any symbol or combination of symbols or bits including, but not limited to, the tag itself.

In step 335, the electronic message can be delivered to the recipient messaging client. The electronic message can be routed through the communication network with the aid of the messaging server as well as one or more other network nodes as may be required. In step 340, the recipient messaging client can receive the electronic message. In step 345, the recipient messaging client can classify the electronic message according to the encoded tag(s). For example, the recipient messaging client can identify the identifier(s) encoded into the electronic message, determine the tags specified by the identifier(s), and classify the electronic message within the recipient messaging client according to the tags specified by the identifier(s).

The classified electronic message can be stored within the recipient messaging client, the messaging server, or other data store along with data that associates the electronic message with the tag(s) specified by the sender. When the message is viewed, the tag information also can be presented and further can be available for various sorting and/or data retrieval operations involving the electronic message. Classification of the electronic message further can be include one or more programmatic actions that may be performed automatically responsive to acceptance or identification of a tag associated with an electronic message. Such actions may be performed by a messaging client and/or by the messaging server. For example, such actions can include, but are not limited to, moving the electronic message to a folder, changing the color of the electronic message, flagging the electronic message, automatically re-routing the electronic message, or the like.

Figure 4:
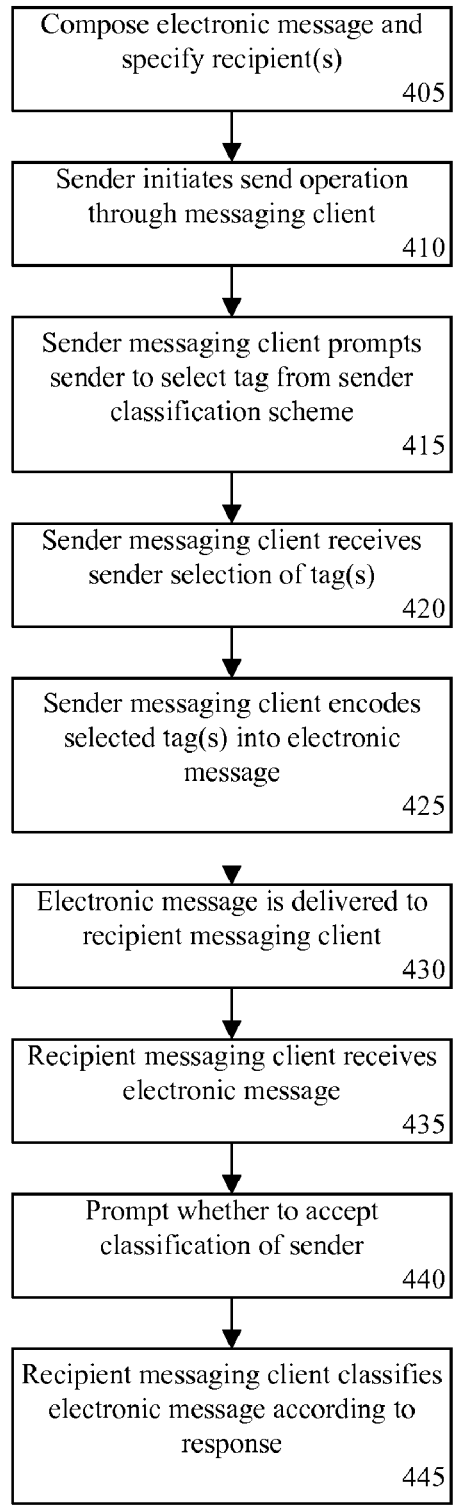
FIG. 4 is a flow chart illustrating a method of sorting an electronic message in accordance with another embodiment of the present invention.

FIG. 4 is a flow chart illustrating a method 400 of sorting an electronic message in accordance with another embodiment of the present invention. The method 400 can be implemented by a system as described with reference to FIG. 1 or other similar system. The method 400 can begin in step 405 where a sender composes an electronic message within, or using, a sender messaging client. The sender can specify one or more recipients of the electronic message.

In step 410, the sender can initiate a send operation from the sender messaging client to deliver the electronic message to the recipient(s). In step 415, the sender messaging client can prompt the sender to select one or more tags from a classification scheme associated with, or defined by, the sender. In one embodiment, the sender classification scheme can correspond to the classification scheme of the recipient, e.g., through mapping or may be identical. In another embodiment, the sender classification scheme may not correspond to the classification scheme of the recipient, e.g., the sender classification scheme can specify one or more tags without a one-to-one relationship to a tag within the recipient classification scheme. As noted, classification of the electronic message may be performed or implemented prior to initiating the send operation.

In step 420, the sender messaging client can receive a user input specifying one or more tags from the sender classification scheme. In step 425, the sender messaging client can encode the selected tag(s), e.g., an identifier or identifiers, into the electronic message. In step 430, the electronic message can be delivered to the recipient messaging client. In step 435, the recipient messaging client can receive the electronic message.

In step 440, the recipient messaging client can prompt the recipient whether to accept the proposed classification of the electronic message from the sender. In step 445, the recipient messaging client can classify the electronic message according to the input received from the recipient. As noted, the classified electronic message can be stored within the recipient messaging client, the messaging server, and/or within another data store of electronic messages. Further one or more tag-dependent programmatic actions may be performed.

For example, when the recipient accepts the classification and the sender specified tag exists in the classification scheme of the recipient, the electronic message can be classified according to the tag encoded therein. When the recipient accepts the classification and the sender specified tag does not exist in the classification scheme of the recipient, the tag can be added automatically to the classification scheme of the recipient and the electronic message can be classified according to the tag. In cases where the recipient rejects the classification, the recipient can be prompted for an alternate classification or tag that can be selected from the recipient classification scheme. Alternatively, the recipient can define a new tag that can be used to classify the electronic message.

It should be appreciated that in some embodiments, prompting the recipient to accept or reject the sender proposed classification can be optional. For example, if the sender proposed tag is found to exist within the recipient classification scheme, then the received electronic message may be automatically classified or associated with the sender proposed tag. Such also can be the case where the sender classification scheme matches or can be mapped to a corresponding tag within the recipient classification scheme.

The exemplary embodiments described herein have been presented for purposes of illustration and are not intended to be limiting. For example, it should be appreciated that functions described as being performed by the messaging clients, in some cases, may be performed by the messaging server or another system tasked with classification scheme management. For example, the identifier of a tag may be inserted within an electronic message by a messaging client or by the messaging server when in route to the recipient. An electronic message further can be diverted to another component or system charged with classification scheme management. That system can insert such identifiers of tags into the electronic message and then re-route the electronic message to the messaging server 105 for delivery or re-route the electronic message directly to the intended recipients.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of sorting electronic messages comprising:
    identifying a plurality of recipients of an electronic message;
    retrieving a classification scheme for each of the plurality of recipients;
    generating a new classification scheme from the classification schemes retrieved for the plurality of recipients, generating the new classification scheme comprising taking a union of the classification schemes retrieved for the plurality of recipients;
    including an identifier within the electronic message, the identifier specifying tags selected from the classification schemes retrieved for the plurality of recipients, and the tags are keywords that describe data with which each respective tag is associated; and
    sending the electronic message comprising the identifier specifying the selected tags.

2. The computer-implemented method of claim 1, further comprising, for each recipient, classifying the electronic message within a messaging client of the recipient according to the specified tag.

3. The computer-implemented method of claim 1, wherein retrieving the classification scheme for each of the plurality of recipients comprises, for each recipient:
    sending a classification scheme request specifying the recipient of the electronic message; and
    receiving the classification scheme associated with the recipient.

4. The computer-implemented method of claim 1, wherein retrieving the classification scheme for each of the plurality of recipients comprises mapping tags of the classification schemes to tags of a classification scheme of a sender of the electronic message, the identifier specifying corresponding tags of the sender classification scheme.

5. A computer-implemented method of sorting electronic messages comprising:
    identifying a plurality of recipients of an electronic message;
    retrieving a classification scheme for each of the plurality of recipients;
    generating a new classification scheme from the classification schemes retrieved for the plurality of recipients, generating the new classification scheme comprising taking an intersection of the classification schemes retrieved for the plurality of recipients;
    including an identifier within the electronic message, the identifier specifying tags selected from the classification schemes retrieved for the plurality of recipients, and the tags are keywords that describe data with which each respective tag is associated; and
    sending the electronic message comprising the identifier specifying the selected tags.

6. The computer-implemented method of claim 1, wherein retrieving a classification scheme for each of the plurality recipients comprises selecting the classification schemes from a plurality of classification schemes associated with each recipient.

7. A computer program product comprising: a computer-usable storage device comprising computer-usable program code stored thereon that sorts electronic messages, the computer-usable storage device comprising:
    computer-usable program code that identifies a plurality of recipients of an electronic message;

computer-usable program code that retrieves a classification scheme for each of the plurality of recipients;

computer-usable program code that generates a new classification scheme from the classification schemes retrieved for the plurality of recipients, the new classification scheme is a union of the classification schemes retrieved for the plurality of recipients;

computer-usable program code that includes an identifier within the electronic message, the identifier specifying tags selected from the classification schemes retrieved for the plurality of recipients, and the tags are keywords that describe data with which each respective tag is associated; and computer-usable program code that sends the electronic message comprising the identifier specifying the selected tags.

8. The computer program product of claim 7, further comprising computer-usable program code that, for each recipient, categorizes the electronic message within a messaging client of the recipient according to the specified tag.

9. The computer program product of claim 7, wherein the computer-program code that retrieves the classification scheme for each of the plurality of recipients comprises:
   computer-program code, for each recipient, that sends a classification scheme request specifying the recipient of the electronic message; and
   computer-program code that, for each recipient, receives the classification scheme associated with the recipient.

10. The computer program product of claim 7, wherein the computer program code that retrieves the classification scheme for each of the plurality of recipients comprises computer-program code that maps tags of the classification schemes of the recipients to tags of a classification scheme of a sender of the electronic message, the identifier specifying, for each recipient, a tag of the recipient classification scheme and a corresponding tag of the sender classification scheme.

11. The computer program product of claim 7, wherein the computer-usable program code that retrieves the classification scheme for each of the plurality recipients comprises computer-usable program code that selects the classification schemes from a plurality of classification schemes associated with each recipient.

12. A computer program product, comprising:
   a computer-usable storage device comprising computer-usable program code stored thereon that sorts electronic messages, the computer-usable storage device comprising:
   computer-usable program code that identifies a plurality of recipients of an electronic message;
   computer-usable program code that retrieves a classification scheme for each of the plurality of recipients;
   computer-usable program code that generates a new classification scheme from the classification schemes retrieved for the plurality of recipients, the computer-usable program code that generates the new classification scheme comprising computer-usable program code that takes an intersection of the classification schemes retrieved for the plurality of recipients;
   computer-usable program code that includes an identifier within the electronic message, the identifier specifying tags selected from the classification schemes retrieved for the plurality of recipients, and the tags are keywords that describe data with which each respective tag is associated; and
   computer-usable program code that sends the electronic message comprising the identifier specifying the selected tags.

* * * * *